United States Patent [19]
Cordrey et al.

[11] 3,943,045
[45] Mar. 9, 1976

[54] IRRADIATION OF HYDROPHILIC AND HYDROPHOBIC MONOMERS TO PRODUCE HYDROPHILIC COPOLYMERS

[75] Inventors: Philip William Cordrey, London; John David Frankland, Romford; Donald James Highgate, Guildford, all of England

[73] Assignee: Special Polymers Limited, London, England

[22] Filed: Mar. 12, 1973

[21] Appl. No.: 340,010

[30] Foreign Application Priority Data
Mar. 13, 1972 United Kingdom............ 11627/72

[52] U.S. Cl. 204/159.22; 204/159.15; 204/159.16; 204/159.17; 260/857 G; 260/873; 260/884; 260/885; 260/886
[51] Int. Cl.²............... C08F 2/48; C08F 2/54
[58] Field of Search............ 204/159.15, 159.22; 260/885; 264/1

[56] References Cited
UNITED STATES PATENTS

| | | | |
|---|---|---|---|
| 3,699,089 | 10/1972 | Wichterle | 260/86.1 |
| 3,721,657 | 3/1973 | Seiderman | 260/80.72 |
| 3,792,028 | 2/1974 | Seiderman | 260/80.72 |

*Primary Examiner*—Murray Tillman
*Assistant Examiner*—Thurman K. Page
*Attorney, Agent, or Firm*—Woodhams, Blanchard and Flynn

[57] ABSTRACT

A hydrophilic polymer or copolymer is produced in an environment free from a chemical initiator and preferably by irradiation of the starting materials, particularly by gamma rays. The product polymer or copolymer is thus free from the residua of chemical initiators and the method permits the production of polymers and copolymers which are particularly suitable for use in contact with living tissue, for example as contact lenses, prosthetic devices, surgical implants, protective corneal fittings and protective membranes or bandages.

15 Claims, No Drawings ial polymerisation processes. In
IRRADIATION OF HYDROPHILIC AND HYDROPHOBIC MONOMERS TO PRODUCE HYDROPHILIC COPOLYMERS The invention relates to a method of polymerisation and the polymers of improved properties so formed.

In the polymerisation of monomer materials by conventional means, polymerisation takes place by the agency of a chemical initiator and cross-linking can proceed by means of a cross-linking agent. One of the criteria for evaluating a hydrophilic polymer is the capacity of the polymer for absorbing water. A second criterion is the elimination of any chemical agent or residue of the polymerisation process likely to cause an unfavourable reaction in living tissue. These criteria are particularly important in respect of polymers for use in the production of ophthalmic devices such as contact lenses, prosthetic devices, and other devices for use in contact with living tissue. A third is the mechanical durability and hydraulic and gas permeability.

Until now, difficulty has been encountered in providing polymers suitable for use in contact with living tissue. In particular, difficulty has been encountered in providing polymers which are capable of absorbing more than their own weight of water, with a low degree of chemical residue and sufficient mechanical strength.

However, it has now been found that by subjecting hydrophilic monomer materials to high energy electromagnetic radiation in the ultraviolet ray to gamma ray range, it is possible to obtain polymers capable of absorbing up to five time or more of their own weight of water. These polymers, moreover, are eminently suitable for use in contact with living tissue because they contain none of the harmful contaminants derived from the initiators used in conventional polymerisation.

The invention therefore provides a method of producing a hydrophilic polymer comprising the steps of subjecting at least one hydrophilic monomer material or low molecular weight polymer to high energy electromagnetic radiation in the ultraviolet ray to gamma ray range. The hydrophilic component may contain a heterocyclic group.

Hydrophilic monomer materials which have been found suitable for use in the method according to the invention include:- methacrylic acid, acrylic acid; N-vinyl pyrrolidones, preferably N-vinyl-2-pyrrolidone; vinyl pyridines, preferably 4-vinyl pyridine; hydroxyalkyl methacrylates, preferably 2-hydroxyethyl methacrylate and hydroxypropyl methacrylates, particularly 2-hydroxypropyl methacrylate.

The hydrophilic monomer material or combination of hydrophilic materials chosen can be varied so as to obtain polymers having different properties. Thus, the water uptake of the polymer may be varied by the control of chemical composition and radiation treatment to lie between one half of the dry weight of the polymer and 10 times the dry weight of the polymer, while retaining mechanical properties and optical transparency consistent with its use as an ophthalmic device or biologically acceptable implant. Liquid and gas permeability in the hydrated state may be controlled both by radiation treatment and polymerisation in the presence of an extending agent. The colour of the sample or polymer may also be controlled by using suitable dyes in admixture with or included in the monomer material and polymerised in situ without complications of chemical initiator interaction or degradation common in conventional polymerisation processes. In the same way biologically active substances may be included, particularly therapeutic substances such as antibiotics, bactericides, fungicides, steroids, and hormone preparations, for example mydriacyl, cetamide, dendrid, tropicamide, idoxuridine and sulphacetamide sodium. Instead of including such ingredients during the polymerisation stage, they may be added by absorption from solution by hydrating the polymer.

The properties of the resultant polymers can also be varied by including, in the monomer material subjected to irradiation, one or more hydrophobic materials. Suitable hydrophobic monomer materials for this purpose include alkyl acrylates; alkyl methacrylates such as methyl methacrylate; styrene; and $\epsilon$-caprolactam.

The properties of the resultant polymers may also be varied by varying the proportions of the monomers present and by varying the amount of radiation provided. The molar ratio of hydrophilic monomer to hydrophobic monomer may, for example, be between ten to one and one to two but is preferably between 2 to 1 and 5 to 1.

Additional control of strength and permeability is possible by the radiation polymerisation of monomer materials in the presence of a suitable chemically "passive" extending agent, for example, water or glycerol. The ratio of extending agent to monomer mix may vary between 1 to 20 and 2 to 1, but is preferably between 1 to 1 and 1 to 10.

Where the hydrophilic monomer is N-vinyl-2-pyrrolidone, hydroxyethyl methacrylate, hydroxyethyl acrylamide, or simply an extending agent, the hydrophobic material may be a hydrophobic polymer such as nylon; nylon 6,6; nylon 6, 10; nylon 11; nylon 12; or the polyamide of terephthalic acid and an alkyl-substituted hexamethylene diamine, for example; a mixture of isometric 2,2,4- and 2,4,4- trimethylhexamethylene diamines; a polyalkyl methacrylate or a polyalkyl acrylate such as polymethyl methacrylate or polymethyl acrylate, polystyrene, polyvinyl chloride, a bisphenol polycarbonate, or any copolymer derived from (monomers of) the above homopolymers. Alternatively, an unsaturated polymer, that is one containing unsaturated links such as carbon-carbon double bonds — for example an unsaturated polyester —, could be used as the hydrophilic material.

The ratio of hydrophobic polymer to hydrophilic monomer can be varied between 1 is to 10 and 2 is to 1, but is often dependent upon the solubility of the hydrophobic polymer in the hydrophilic monomer. Suitably, the ratio should be between 1 is to 5 and 1 is to 1.

The hydrophobic polymer material is dissolved in the hydrophilic monomer material, placed in a suitable mould, and exposed to ionizing electromagnetic radiation, or the polymer may be irradiated alone and then contacted with the hydrophilic monomer. Graft polymerisation is initiated by quantities of long lived radicals trapped in the solid polymer. The resultant polymerised and possible lightly cross-linked mass is a rigid hydrophilic transparent material of enhanced elasticity and physical properties.

It is understood that as a result of electromagnetic radiation, the molecules are ionised or radiolytic bond breaking produces free radicals so as to provide attachment sites at which the ionised molecules or free radicals are capable of attaching themselves to similarly ionised molecules or free radicals. By varying the amount of radiation, and thus the amount of ionisation. It has been found possible to control the formation of homopolymer and copolymer material and to control the extent of cross-linking between the polymer chains.

It has been observed that the water uptake, swelling capacity, tensile and tear strengths for a fixed hydrophobic unit to hydrophilic unit ratio. [Such as that between the polyamide of terephthalic acid and an alkyl-substituted hexamethylene diamine, for example a mixture of isomeric 2,2,4- and 2,4,4-trimethylhexamethylene diamines and N-vinyl-2-pyrrolidone, or that between a polyalkyl acrylate such as poly(methyl acrylate) and N-vinyl-2-pyrrolidone, or that between a poly(alkyl methacrylate) such as poly(methyl methacrylate) and N-vinyl-2-pyrrolidone, or that between an alkyl acrylate or methacrylate such as methyl acrylate or methyl methacrylate and N-vinyl-2-pyrrolidone], can be controlled by the addition of one or more difunctional or poly-functional compounds which act as selective cross-linking agents and can vary the cross-link density compared to that resulting for a given radiation dose. Suitable selective cross-linking materials include di-vinylbenzene, allyl methacrylate, ethylene glycol dimethacrylate, in concentrations up to about twenty percent by weight of the total weight of polymer or monomer mix but usually the desired effect can be obtained using concentrations between 0.01% by weight and 5% by weight of the total weight of mix.

If a material suitable for forming into the desired product by moulding is required, the molecular weight of the polymer formed can be controlled by the addition of a mutual solvent, i.e. compatible with the monomer system or the polymer/monomer system, such as acetone, carbon tetrachloride, ethanol, etc. Adjustment of the ratio of monomer to solvent controls monomer/monomer contacts and this affects the length of the polymer chains produced in the addition polymerisation process. By evaporation of the solvent or precipitation in a non-solvent followed by drying and grinding of the cross-linked suitable moulding materials are obtained. These can be crosslinked in the desired mould by addition of cross-linking agents in proportions up to 10% of the total polymer weight, preferably between 1% and 5% by weight. Such materials are diamines, such as hexamethylene diamine, or dianhydrides which on heating promote cross-linking by condensation reactions with such functional groups as hydroxyl or amide present in the polymer structure.

A typical electromagnetic radiation having a quantum energy lying between 60 and 100 MeV, which is suitable for the present invention, is the gamma ray radiation from a Cobalt 60 source. Where such radiation is used, a radiation dosage of 2-5 MegaRads, for example 2.5 MegaRads, has been found effective.

The necessary dosage may be administered over any period between 1 and 48 hours, typically over a period of about 9 hours.

The degree of polymerisation is generally at least 95% is advantageously better than 98% and can be better than 99.8%.

The invention is illustrated in the following Examples. The water uptake or absorption of the polymer was determined by removing the solid polymer/copolymer from the tubular polyethylene container and cutting a disc 3 mm. thick from the centre. The disc was weighed under anhydrous conditions and then immersed in saline solution (pH 7.3) and the uptake of water after immersion for specific periods was determined by reweighing after carefully blotting off all the surface water. The water absorbed was given as a percentage calculated as follows:

$$\text{Percentage water absorbed} = \frac{(W_1 - W_0) \, 100}{W_0}$$

where $W_0$ is the weight of the disc before immersion and $W_1$ its weight after immersion.

The concentration of monomer left in the polymer after polymerisation and consequently the degree of polymerisation was ascertained by gas-liquid chromatographic and ultra-violet spectrophotometry examinations of water and solvent washings from the polymer.

EXAMPLE 1

A mixture of 40g. of freshly distilled N-vinyl-2-pyrrolidone and 10g. of freshly distilled methyl methacrylate was purged with nitrogen and sealed in a polyethylene tube. The tube was subjected to a dose of 2.5 MegaRads of ionising radiation from a Cobalt 60 source. The solid copolymer formed was very hard and transparent. The water absorption of the copolymer determined on a 3 mm. thick disc was 710% after immersion for one day, 920% after immersion for two days and 104% after immersion for eleven days. The disc was transparent, light amber coloured, very flexible and strong, and greatly swollen after immersion for eleven days. The degree of polymerisation was found to be better than 98%.

EXAMPLE 2

A mixture of 30g. of freshly distilled N-vinyl-2-pyrrolidone, 10g. of freshly distilled methyl methacrylate and 0.4g. of allyl methacrylate was purged with nitrogen and sealed in a polyethylene tube. The tube was subjected to a dose of 2.5 MegaRads of ionising radiation from a Cobalt 60 source. The solid copolymer formed was very hard and transparent. The water absorption of the copolymer determined on a 3 mm. thick disc was 250% after immersion for three days. The disc was transparent, light amber coloured, very flexible and strong, and greatly swollen after immersion for eleven days. The degree of polymerisation was found to be better than 98%.

EXAMPLE 3

A mixture of 20g. of freshly distilled N-vinyl-2-pyrrolidone, 10g. of freshly distilled methyl methacrylate and 0.15g. of allyl methacrylate was purged with nitrogen and sealed in a polyethylene tube. The tube was subjected to a dose of 2.5 MegaRads of ionising radiation from a Cobalt 60 source. The solid copolymer formed was very hard and transparent. The water absorption of the copolymer determined on a 3 mm. thick disc was 240% after immersion for three days. The disc was transparent, light amber coloured, very flexible and strong, and greatly swollen after immersion for eleven days. The degree of polymerisation was found to be better than 98%.

EXAMPLE 4

A mixture of 25g. of freshly distilled N-vinyl 2-pyrrolidone, 10g. of freshly distilled methyl methacrylate and 0.35g. allyl methacrylate was purged with nitrogen and sealed in a polyethylene tube. The tube was subjected to a dose of 2.5 MegaRads of ionising radiation from a Cobalt 60 source. The solid copolymer formed was very hard and transparent. The water absorption of the copolymer determined on a 3 mm. thick disc was 265% after immersion for three days. The disc was transparent, light amber coloured, very flexible and strong, and greatly swollen after immersion for eleven days. The degree of polymerisation was found to be better than 98%.

EXAMPLE 5

15g. of freshly distilled 2-hydroxymethyl methacrylate was purged with nitrogen and sealed in a polyethylene tube. The tube was subjected to a dose of 2.5 MegaRads of ionising radiation from a Cobalt 60 source. The solid copolymer formed was very hard, clear and transparent. The water absorption of the polymer determined on a 3 mm. thick disc was 43% after immersion for four days. The disc was clear, strong, flexible and swollen after immersion for four days. The degree of polymerisation was found to be better than 98%.

EXAMPLE 6

25g. of freshly distilled 2-hydroxymethyl methacrylate and 25g. of de-ionised water was purged with nitrogen and sealed in a polyethylene tube. The tube was subjected to a dose of 2.5 MegaRads of ionising radiation from a Cobalt 60 source. The polymer formed was white, opaque and very soft and pliable. A sample of the solid polymer so formed was dehydrated to remove all the water present by heating the material to constant weight in a vacuum oven at 30°C under a vacuum of 3 Torr. The dehydrated polymer was clear, hard and brittle. The water absorption of the dehydrated polymer determined on a 3 inch thick disc was 53% after immersion for one day and 70% after immersion for four days. The disc was clear, strong, flexible and swollen after immersion for 4 days. The degree of polymerisation was found to be better than 98%.

EXAMPLE 7

A mixture of 25g. of freshly distilled N-vinyl-2-pyrrolidone and 25g. of de-ionised water was purged with nitrogen and sealed in a polyethylene tube. The tube was subjected to a dose of 2.5 MegaRads of ionising radiation from a Cobalt 60 source. The solid polymer so formed was clear and very soft and pliable. The water absorption of the polymer was 400% after immersion for one day, 600% after immersion for seven days and 830% after immersion for eleven days. These figures represent a total water content of 900% after immersion for one day, 1,300% after immersion for two days and 1,690% after immersion for eleven days. The disc was clear, very flexible and swollen, but had somewhat reduced mechanical strength after immersion for eleven days. The sample of polymer was dehydrated as described in Example 6. The dehydrated polymer was clear, hard and very brittle. The water absorption of the dehydrated polymer determined on a 3 mm. thick disc was 472% after immersion for one day and 1,100% after immersion for four days. The degree of polymerisation was found to be better than 98%.

EXAMPLE 8

A mixture of 10g. of freshly distilled N-vinyl-2-pyrrolidone and 10g. of hydroxyethyl methacrylate and 20g. of di-ionised water was purged with nitrogen and sealed in a polyethylene tube. The tube was subjected to a dose of 2.5 MegaRads of ionising radiation, from a Cobalt 60 source. The solid copolymer so formed was clear and very soft and pliable. The water absorption of the copolymer determined on a 3 mm. thick disc was 122% after immersion for one day, 158% after immersion for two days and 250% after immersion for eleven days. This represents a total water content of 843% after immersion for eleven days. A sample of the solid copolymer was dehydrated as described in Example 6. The dehydrated copolymer was clear, hard and brittle. The water absorption of the copolymer determined on a 3 mm. thick disc was 120% after immersion for one day, 160% after immersion for two days and 245% after immersion for 11 days. These figures represent a total water content of 250% after immersion for one day, 325% after immersion for two days and 500% after immersion for eleven days. The disc was clear, flexible, swollen, and strong after immersion for eleven days. The degree of polymerisation was found to be better than 98%.

EXAMPLE 9

A mixture of 2g. of polyethylene oxide and 40g. of de-ionised water was purged with nitrogen and sealed in a polyethylene tube. The tube was subjected to a dose of 2.5 MegaRads of ionising radiation from a Cobalt 60 source. The cross-linked polymer was clear, very soft and pliable. A sample of the cross-linked polymer was dehydrated as described in Example 6. The dehydrated polymer was clear, hard and brittle. The water absorption of the dehydrated polymer was 2,300% after immersion for one day and 2,800% after immersion for four days. The disc was clear flexible, swollen and fairly weak after immersion for 4 days.

EXAMPLE 10

A mxiture of 2.5g. of polyacrylamine and 50g. of de-ionised water was purged with nitrogen and sealed in polyethylene tube. The sample was subjected to a dose of 2.5 MegaRads of radiation from a Cobalt 60 source. A transparent cross-linked gel resulted which proved capable of dehydration and subsequent rehydration, absorbing 150% water while retaining good tensile strength and elongation to break.

EXAMPLE 11

A mxiture of the polyamide of terephthalic acid and a mixture of 2,2,4- and 2,4,4-trimethylehexamethylene diamines dissolved in N-vinyl-2-pyrrolidone so that the weight ratio of the polyamide to the N-vinyl-2-pyrrolidone was 1 : 3. The solution or mixture was subjected to an absorbed dose of 2 MegaRads of gamma ray radiation from a Cobalt 60 source, and a rigid transparent polymer was produced. The water absorption of this polymer was 230% afater immersion for four days.

The material produced was transparent, flexible and of high tensile strength and tear resistance, and was particularly suitable for use in contact lenses. The degree of polymerisation was found to be better than 98%.

EXAMPLE 12

The polyamide of terephthalic acid and a mix of 2,2,4- and 2,4,4- trimethylhexamethylene diamines was dissolved in N-vinyl-2-pyrrolidone so that the weight ratio of the polyamide to the N-vinyl-2-pyrrolidone was 1 : 4. An amount of allyl methacrylate representing 1% of the total mixture was dissolved in the mixture. The mixture was subjected to an absorbed dose of 2 Mega-Rads of gamma ray radiation from a Cobalt 60 source, and a rigid transparent polymer was produced. The water absorption of this polymer was 220% after immersion for three days. The degree of polymerisation was found to be better than 98%.

The material produced was transparent, flexible and of high tensile strength and tear resistance, and was particularly suitable for use in contact lenses.

Any residual stress in the material produced by any of the Examples 1-7 after polymerisation could be improved or relieved by heat treatment under vacuum at 120°C. for four hours. The colour of the polymer changed from light amber to yellow after this treatment.

The material produced by any of the Examples 1 to 7, may be polymerised by radiation in a mould to produce a lens, implant or article of complex shape without subsequent machining.

As has hereinbefore been indicated, the hydrophilic polymers and copolymers produced according to the invention are very suitable for use in contact with living tissue. Thus many of the polymers and copolymers are suitable for use as contact lenses and for prosthetic use, for example as heart valves or inserts in the inner ear cavity. Many of the polymers and copolymers are also suitable for use as dialysis membranes in artificial kidney machines, and as protective corneal membranes. Such protective corneal membranes or soft lenses are suitable for use when an eye has been injured or is in need of protection for any other reason and such corneal membrane may be made opaque. As hereinbefore stated, the hydrophilic polymers and copolymers may incorporate a medicinally or therapeutically active ingredient such as an antibiotic. Thus the protective membrane for the eye may include an antibiotic or other drug and so function not only as a protective membrane for the eye but also as a vehicle for the installation of a drug into the eye. The hydrophilic polymers and copolymers may also be used as carriers, for example carriers of drugs, for oral administration.

We claim:

1. A method for the production of a hydrophilic copolymer, which comprises subjecting to copolymerization an initial mixture of (a) hydrophilic monomer selected from the group consisting of methacrylic acid, acrylic acid, N-vinyl pyrrolidones, vinyl pyridines, hydroxy alkyl methacrylates and mixtures thereof, and (b) hydrophobic monomer selected from the group consisting of alkyl acrylates, alkyl methacrylates, styrene and diethyleneglycol bis(allyl carbonate) and, as the only monomers in the polymerization system, said monomers being mixed in a molar ratio of a/b in the range of 10/1 to ½, in an environment free of chemical polymerization initiator and any residue thereof, by subjecting the initial mixture to electromagnetic radiation in the ultraviolet-gamma ray range using a radiation dosage of from 2 to 5 megarads administered over a time period of from one to 48 hours, to give a degree of polymerization of at least 95%.

2. A method according to claim 1, in which the radiation has a quantum energy in the range 60 – 100 MeV.

3. A method according to claim 1, in which the radiation is gamma rays.

4. A method according to claim 3, in which the radiation source is cobalt 60.

5. A method according to claim 4, in which said dosage is substantially 2.5 Megarads.

6. A method according to claim 3, in which the hydrophobic monomer is a member of the group consisting of methyl acrylate and methyl methacrylate.

7. A method according to claim 3, in which said hydrophilic monomer is a member of the group consisting of N-vinyl-pyrrolidones and vinylpyridines.

8. A method according to claim 3, in which said hydrophilic monomer is a member of the group consisting of N-vinyl-2-pyrrolidone and 4-vinylpyridine.

9. A method according to claim 3, in which said molar ratio is from 5 : 1 to 2 : 1.

10. A method according to claim 3, in which the polymerisation is carried out in the presence of a minor proportion of a selective cross-linking agent.

11. A method according to claim 10, in which the cross-linking agent is a member of the group consisting of allyl methacrylate, divinylbenzene and ethylene glycol dimethacrylate.

12. A method according to Claim 3, in which said initial mixture consists essentially of N-vinyl-2-pyrrolidone, methyl methacrylate and allyl methacrylate.

13. A method according to Claim 3, in which said hydrophilic monomer consists of a hydroxyalkyl methacrylate.

14. A method according to Claim 3, in which said hydrophilic monomer consists of N-vinyl-2-pyrrolidone and said hydrophobic monomer consists of methyl methacrylate.

15. A method according to claim 3, carried out in vacuo or in an inert atmosphere.

* * * * *